United States Patent Office 2,863,870
Patented Dec. 9, 1958

2,863,870

PURIFICATION OF THIAMIN COMPOUNDS

Carmine Ciriello, Naples, Italy, assignor to S. p. A. Prod. Farmaceutici Specializzati Dott. M. Calosi & F.°, Florence, Italy, a company of Italy No Drawing. Application September 17, 1956
Serial No. 610,419

Claims priority, application Italy October 19, 1955

5 Claims. (Cl. 260—256.6)

This invention relates to a process for preparing electrophoretically pure chloride of thiamin orthophosphoric ester and chloride of thiamin pyrophosphoric ester (cocarboxylase), starting from their mixtures contaminated by thiamin hydrochloride.

The thiamin orthophosphoric and pyrophosphoric esters are commonly used in the human therapy due to their pharmaceutical and co-enzymatic features, respectively. As their use is differentiated, said esters must be pure and free from thiamin hydrochloride having a greater toxicity together with a lesser or nil activity. The pureness of these chemical compounds may be easily analyzed by the N. Siliprandi and D. Siliprandi method (Riv. Ist. Sieroterap. It., 29, n. 4, 1954) by electrophoresis on paper.

One object of this invention is that of obtaining electrophoretically pure (i. e. showing one single spot on the electrophoretic diagram on paper) chloride of thiamin orthophosphoric ester and chloride of thiamin pyrophosphoric ester, starting from mixtures comprised of either thiamin hydrochloride and thiamin orthophosphoric ester chloride or thiamin hydrochloride, thiamin orthophosphoric ester chloride and thiamin pyrophosphoric ester chloride, respectively.

Another object of this invention is the product obtained thereby.

Said objects are reached by treating said mixtures with sulphonic ion-exchange resins showing a preferential adsorption for the thiamin hydrochloride (the most adsorbed) and for the thiamin phosphoric esters (which are the more difficultly adsorbed, the more the number of phosphoric rests increases). This way it is possible to obtain the thiamin orthophosphoric ester chloride free from its mixture with thiamin hydrochloride and thiamin orthophosphoric ester by causing the thiamin hydrochloride to be adsorbed by said resins; likewise, it is possible to obtain the pure thiamin pyrophosphoric ester chloride from its mixture with thiamin hydrochloride, thiamin orthophosphoric ester chloride and thiamin pyrophosphoric ester, by causing the thiamin hydrochloride and the thiamin orthophosphoric ester chloride to be adsorbed by said resins.

The process according to this invention is set forth with reference to two preferred examples of embodiment.

*Example I.—Preparation of the electrophoretically pure thiamin orthophosphoric ester chloride (one single spot on the electrophoretic diagram on paper)*

A mixture containing from 0.1 to 90% of thiamin hydrochloride and from 99.9 to 10% of thiamin orthophosphoric ester chloride, dissolved in distilled water in the amount of 100 g. per liter, is strongly stirred with an amount of sulphonic ion-exchange resin "Amberlite IRA–120" (or Amberlite IRA–100, or Amberlite IRA–105, or Duolite C–3, or Lewatit XS, or Wofatit K, or Dowex 50, and so on) proportional to the present thiamin hydrochloride and precisely of about 0.5 liter for each 100 g. of thiamin hydrochloride. When the stirring has been completed, the mixture is filtered and 1 cc. of concentrated hydrogen chloride is added for each gram of present thiamin orthophosphoric ester. The mixture is diluted with about 40 volumes of acetone, and after about 24 hours, the crystals of thiamin orthophosphoric ester chloride are separated by filtration or centrifugation. These crystals are washed with ethanol and ether, and dried under vacuum. The characteristics of this substance are as follows:

Empirical formula: $C_{12}H_{18}N_4O_4PSCl \cdot 2H_2O$.

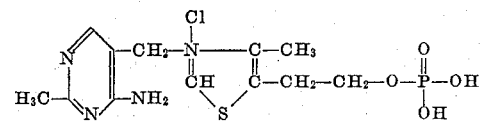

Melting point: 199°–200° C. (Kofler block).
Absorption in ultraviolet: $E_{max}$ 10,400 at 2350 A.; $E_{max}$ 7760 at 2700 A., in phosphate buffer at pH 6.5.
Electrophoresis on paper: acetate buffer pH 5.1, ionic force 0.07, current 200 volts, 7 mA., 3 hours, Gryksbo Munktell 20 paper: one single spot migrating towards the negative pole, said spot being detectable by fluorescence after spraying with potassium ferricyanide in alkali solution.

*Example II.—Preparation of the electrophoretically pure thiamin pyrophosphoric ester chloride (one single spot on the electrophoretic diagram on paper)*

A mixture containing from 0.1 to 90% of thiamin hydrochloride, from 0.1 to 90% of thiamin orthophosphoric ester chloride and from 0.1 to 90% of the chloride of the thiamin pyrophosphoric ester (cocarboxylase) in water solution at a concentration of 70 g. per liter of thiamin pyrophosphoric ester chloride is strongly stirred with sulphonic ion-exchange resin Amberlite IRA 120 (or Amberlite IRA 100) (or Amberlite IRA 105), (or Duolite C3), (or Lewatit KS), (or Wofatit K), (or Dowex 50 and so on) in amounts proportional to the present amounts of thiamin hydrochloride and of thiamin orthophosphoric ester chloride, in the amount of about 0.9 liter per 100 g. of present thiamin hydrochloride or thiamin orthophosphoric ester chloride. When the stirring is ended, the product is filtered, 1 cc. of concentrated hydrogen chloride is added for each gram of cocarboxylase present and the product is diluted with about 40 volumes of acetone. After about 24 hours, the crystals of thiamin pyrophosphoric ester chloride are filtered, washed with ethanol, then with ether and finally dried under vacuum. The characteristics are as follows:

Empirical formula: $C_{12}H_{19}N_4O_7P_2SCl \cdot H_2O$.

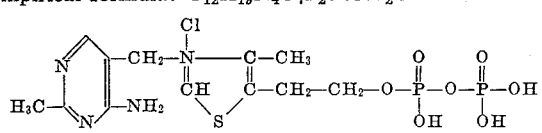

Melting point: 240° C. (Kofler block).
Absorption in ultraviolet: $E_{max}$ 11,900 at 2350 A.; $E_{max}$ 8890 at 2700 A. in phosphate buffer at pH 6.5.
Electrophoresis on paper: one single spot migrating towards the positive pole. Gryksbo Munktell 20 paper, 200 volts current, 7 mA., 3 hours, acetate buffer pH 5.1, ionic force 0.07. The spot may be detected after spraying with alkaline ferricyanide (potassium ferricyanide) due to the fluorescence of said spot.

While the present invention has been described in some preferred forms, it is understood that non-essential variations may be effected without issuing from the scope of this invention. For instance instead of thiamin orthophosphoric ester chloride or of thiamin pyrophosphoric ester chloride, other salts thereof may be used.

I claim:

1. A process for preparing the chloride of thiamin phosphoric acid esters from an impure mixture of thiamin hydrochloride and thiamin phosphoric acid ester, which comprises dissolving in water a mixture of the thiamin chloride and the thiamin phosphoric acid ester, adding to the solution a sulphonic ion-exchange resin in sodium form, whereby said sulphonic resin takes up the thiamin leaving in solution the thiamin phosphoric acid ester, filtering the sulphonic resin whereby a solution is obtained containing only the thiamin phosphoric acid ester.

2. A process for preparing the chloride of thiamin orthophosphoric acid esters from a mixture of thiamin hydrochloride and thiamin orthophosphoric acid ester, which comprises dissolving in water a mixture of thiamin chloride and thiamin orthophosphoric acid ester, adding to the solution a sulphonic ion-exchange resin in sodium form, whereby said resin takes up the thiamin leaving in solution the thiamin orthophosphoric acid ester, filtering the sulphonic resin, whereby filtrate is obtained which contains only the thiamin orthophosphoric acid ester in solution.

3. A process for preparing the chloride of thiamin pyrophosphoric acid ester from a mixture of thiamin chloride, thiamin orthophosphoric acid ester and thiamin pyrophosphoric acid ester which comprises dissolving in water a mixture of thiamin chloride, thiamin orthophosphoric acid ester and thiamin pyrophosphoric acid ester, adding to the solution a sulphonic ion-exchange resin in sodium form, whereby the resin takes up first the thiamin and then the thiamin orthophosphoric ester leaving in solution the thiamin pyrophosphoric acid ester, filtering the resin whereby filtrate is obtained containing only the thiamin pyrophosphoric acid ester in solution.

4. A process for preparing the chloride of thiamin orthophosphoric acid ester which consists in preparing a mixture of the thiamin chloride and the thiamin orthophosphoric acid ester, dissolving said mixture in distilled water, stirring said mixture with a sulphonic ion-exchange resin in sodium form, filtering, adding hydrogen chloride to the filtrate, diluting the filtrate with acetone and separating the thiamin orthophosphoric acid ester chloride crystals, washing the said crystals with ethanol and ether and drying the crystals under vacuum.

5. A process for preparing the chloride of thiamin pyrophosphoric acid ester which consists in preparing a mixture of thiamin chloride, thiamin orthophosphoric acid ester chloride and thiamin pyrophosphoric ester chloride, dissolving the mixture in distilled water, stirring said solution with a sulphonic ion-exchange resin in sodium form, filtering, adding hydrogen chloride to the filtrate, diluting the filtrate with acetone, separating thiamin pyrophosphoric acid ester chloride crystals which appear in the diluted filtrate, washing the said crystals with ethanol and ether and drying the crystals under vacuum.

References Cited in the file of this patent

UNITED STATES PATENTS 2,729,607　　Haagen _____ Jan. 3, 1956

OTHER REFERENCES

Siliprandi et al.: Biochimica et Biophysica Acta, vol. 14, pp. 52–61 (1954).

Weijlard: Jour. Amer. Chem. Soc., vol. 64, pp. 2279–2282 (1942).